C. S. WRIGHT.
HYDRAULIC SWIVEL.
APPLICATION FILED JULY 30, 1913.
1,113,397.
Patented Oct. 13, 1914.
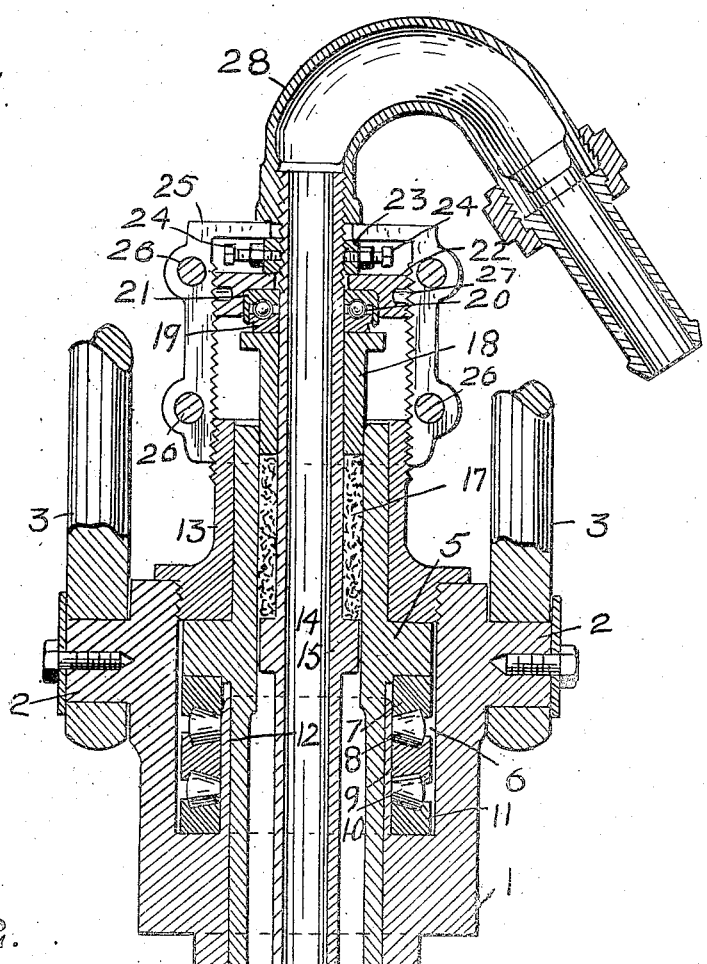
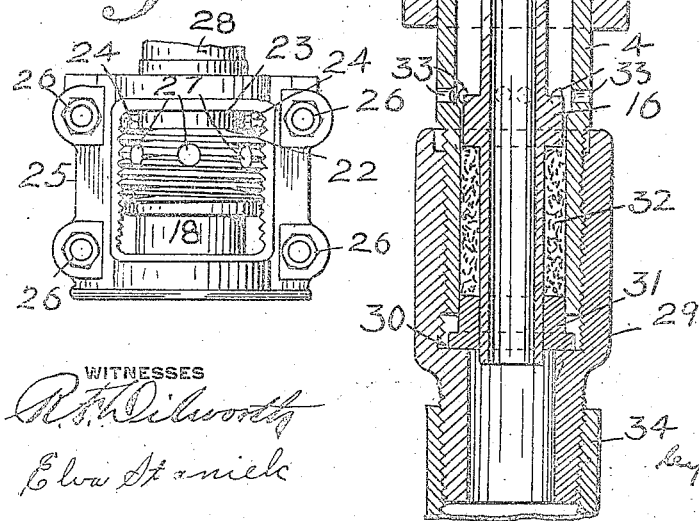
WITNESSES
INVENTOR
C. S. Wright

UNITED STATES PATENT OFFICE.

CLYDE S. WRIGHT, OF TOLEDO, OHIO, ASSIGNOR TO THE NATIONAL SUPPLY COMPANY, OF TOLEDO, OHIO, A CORPORATION OF OHIO.

HYDRAULIC SWIVEL.

1,113,397. Specification of Letters Patent. Patented Oct. 13, 1914.

Application filed July 30, 1913. Serial No. 782,123. REISSUED

*To all whom it may concern:*

Be it known that I, CLYDE S. WRIGHT, a citizen of the United States, residing at Toledo, in the county of Lucas and State of Ohio, have invented new and useful Improvements in Hydraulic Swivels, of which the following is a specification.

My invention relates to hydraulic swivels and its objects are to provide hydraulic swivels with packing boxes which may be separately tightened without loosening or removing parts of the swivel, and which may be tightened while the swivel is in use.

Another object is to provide for the removal of the hose stem after removing the packing-box cap.

A further object is to prevent the lower packing-box gland from dropping down the drill pipe.

Other objects are to prevent sand and water from having access to any of the working parts of the swivel in case it leaks.

Referring to the accompanying drawing, Figure 1 is a vertical section of a hydraulic swivel embodying the principles of my invention, and Fig. 2, an elevation of the upper portion thereof.

On the drawings, 1 represents the trunnion-block having the trunnio 2, to which the ends 3 of the usual bail or clevis are connected.

The swivel stem 4 extends vertically through the trunnion-block and has the bearing ring, collar, or flange 5 extending outwardly from the swivel-stem and into the enlarged recess or opening 6 in the trunnion-block. The flange 5 rests on the bearing block 7 which is supported by the cones or antifriction rollers 8 in the race 9. The latter rests on the lower cones 10 which roll in the race 11 seated on the bottom of the recess 6. The trunnion-block is provided with the tubular wall 12 which rises from the bottom of the recess 6 and extends upwardly between the swivel stem and the said race to form an annular oil receptacle for the cones and races and other bearing parts. The trunnion-block is provided with the cap 13 screwed into the upper end of the recess 6, the bottom of the cap lying close to the upper face of the bearing ring or flange 5 and receives the swivel stem above the flange 5. The hose-stem 14 extends through the swivel stem 4 and is somewhat smaller in diameter than the latter and has the outwardly extending stuffing-box collar 15 in the vicinity of the bearing ring 5 and the stuffing-box collar 16 near its lower end.

17 is packing seated on the collar 15 and between the hose-stem and the swivel stem. This packing is compressed by the gland 18, on which there rests the race 19 for the balls 20. The bearing ring 21 rests on the balls and is carried in a recess in the bottom of the externally threaded ring 22. The hose stem has thereon the nut or collar 23 screwed down on the ring 22, the collar being provided with the set-screws 24 which engage the hose-stem and prevent the collar from turning.

25 is the packing-box cap which rests on the collar 23 and is in threaded engagement with the ring 22 and the upper end of the trunnion-block cap 13. The packing-box cap is preferably divided into lateral halves which are connected together by the bolts 26. The intermediate portions of the halves are removed (Fig. 2) in order that a bar may be inserted in the holes 27 in the ring 22 for rotating the latter.

The goose-neck 28 is screwed on the upper end of the hose-stem and bears on the top of the packing-box cap 25. The coupling 29 is screwed on the outside of the lower end of the swivel stem 4 and is provided with the internal shoulder 30 which serves as a seat for the gland 31 for compressing the packing 32 between itself and the collar 16, and between the lower ends of the hose-stem and swivel-stem.

33 are a series of port-holes in the swivel-stem to permit the escape of any water and sand which may pass the packing 32.

From the construction described it is seen that the gland 31 cannot drop down into the drill-pipe 34 on the lower end of the coupling 29; that water and sand which pass the packing will ordinarily pass out through the port-holes 33; that, if any water and sand should rise above the port-holes, they could not obtain access to the cone-bearings by reason of the packing 17; that either packing can be separately tightened while the swivel is rotating by rotating the packing-box cap 25 or the ring 22, neither of which rotates with the swivel-stem. This can be done without removing or loosening any other parts, and by merely screwing off the cap 25 or by separating its halves, the entire hose-stem can be withdrawn together with the packing 17 and the parts above it.

I claim:

1. In a hydraulic swivel, a trunnion-block, a swivel-stem supported within the same, a hose-stem within the swivel-stem, packing between the two stems, a gland beneath the packing, and means rotatable on the swivel stem for supporting the gland and adjusting the same.

2. In a hydraulic swivel, a trunnion-block, a swivel-stem supported within the same, a hose-stem within the swivel-stem, packing between the two stems, a gland beneath the packing, means for supporting the lower end of the gland, and means for causing the gland to adjust the packing while the swivel is rotating.

3. In a hydraulic swivel, a trunnion-block, a swivel-stem supported within the same, a hose-stem within the swivel-stem, packing between the two stems, a gland beneath the packing, means for supporting the lower end of the gland, and means rotatable with respect to the swivel-stem for causing the gland to adjust the packing.

4. In a hydraulic swivel, a trunnion-block, a swivel-stem therein, a hose-stem in the swivel-stem, separate packings between the two stems, and means for separately compressing the packings without removing or loosening the said parts of the swivel.

5. In a hydraulic swivel, a trunnion-block, a swivel-stem therein, a hose-stem in the swivel-stem, and a packing between the two stems, there being port-holes in the swivel-stem above the packing for the escape of material passing the packing.

6. In a hydraulic swivel, a trunnion-block, a swivel-stem therein, a hose-stem in the swivel-stem, a packing between the two stems, there being port-holes in the swivel-stem above the packing for the escape of material passing the packing, and a second packing between the two stems and above the port-holes.

7. In a hydraulic swivel, a trunnion-block, a swivel-stem therein, a hose-stem in the swivel-stem, a packing between the upper portions of the stems, a gland on the packing, and a cap connected to the trunnion-block and transmitting pressure to the gland, the cap being composed of lateral sections and means for securing them together.

8. In a hydraulic swivel, a trunnion-block, a swivel-stem therein, a hose-stem in the swivel-stem, a packing collar on the hose-stem, packing on the collar, a gland for the packing, and a cap removably connected to the trunnion block and bearing on the gland, whereby the hose-stem is freely removable when the cap has been disconnected from the trunnion-block.

9. In a hydraulic swivel, a trunnion-block, a swivel-stem therein, a hose-stem in the swivel-stem, a coupling on the lower end of the swivel-stem, a packing gland seated on a shoulder in the coupling, and means for causing the gland to compress the packing.

Signed at Toledo, Ohio, this 24 day of July, A. D. 1913.

CLYDE S. WRIGHT.

Witnesses:
R. F. HILL,
M. N. TABER